May 19, 1970      M. BOWDEN ETAL      3,512,575
APPARATUS FOR MAKING METAL BODIES
Filed Dec. 27, 1965      5 Sheets-Sheet 2
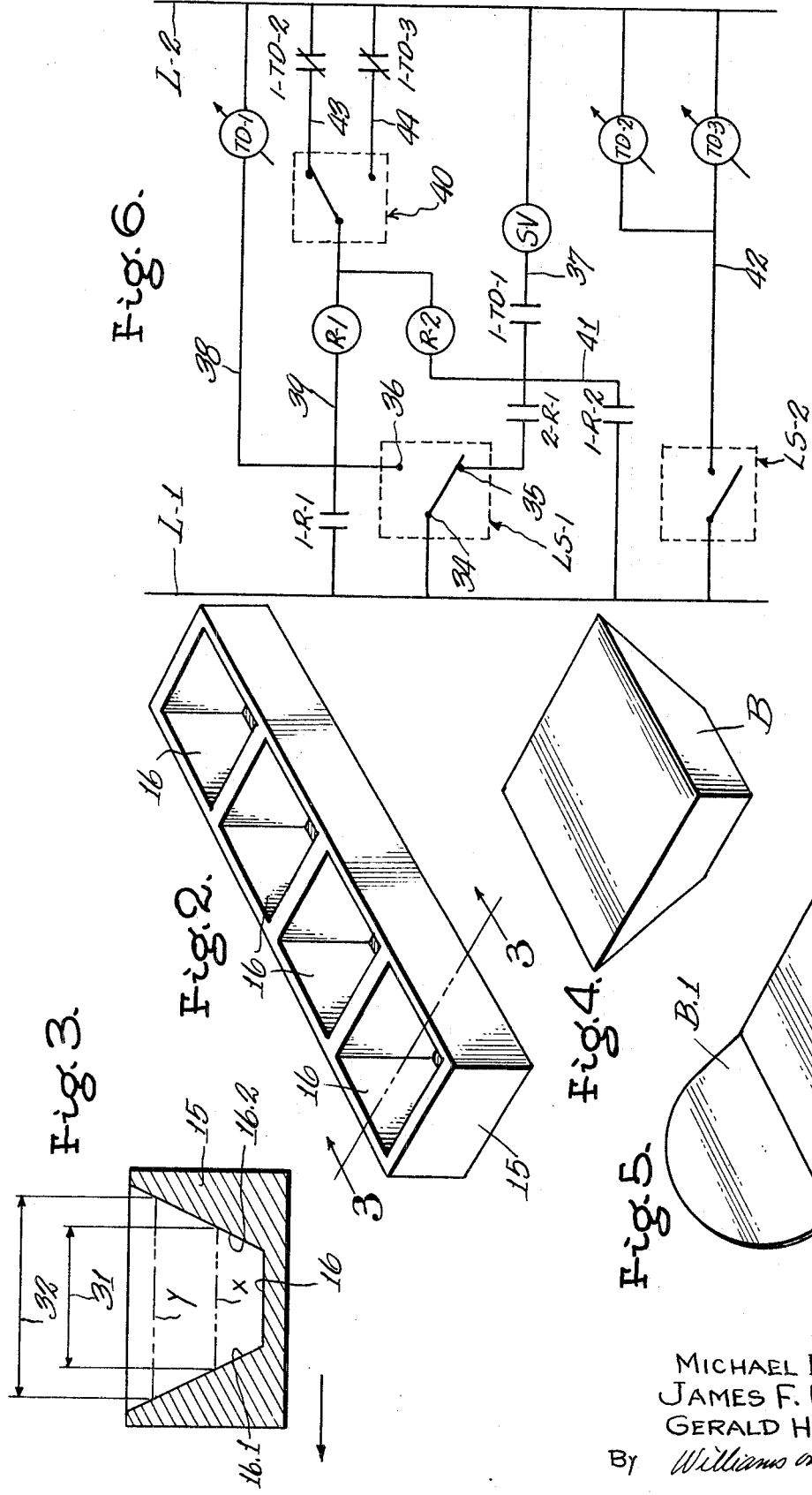
INVENTORS
MICHAEL BOWDEN
JAMES F. McMAHON JR
GERALD H. KRESKE
By *Williams and Kreske*
ATTORNEYS

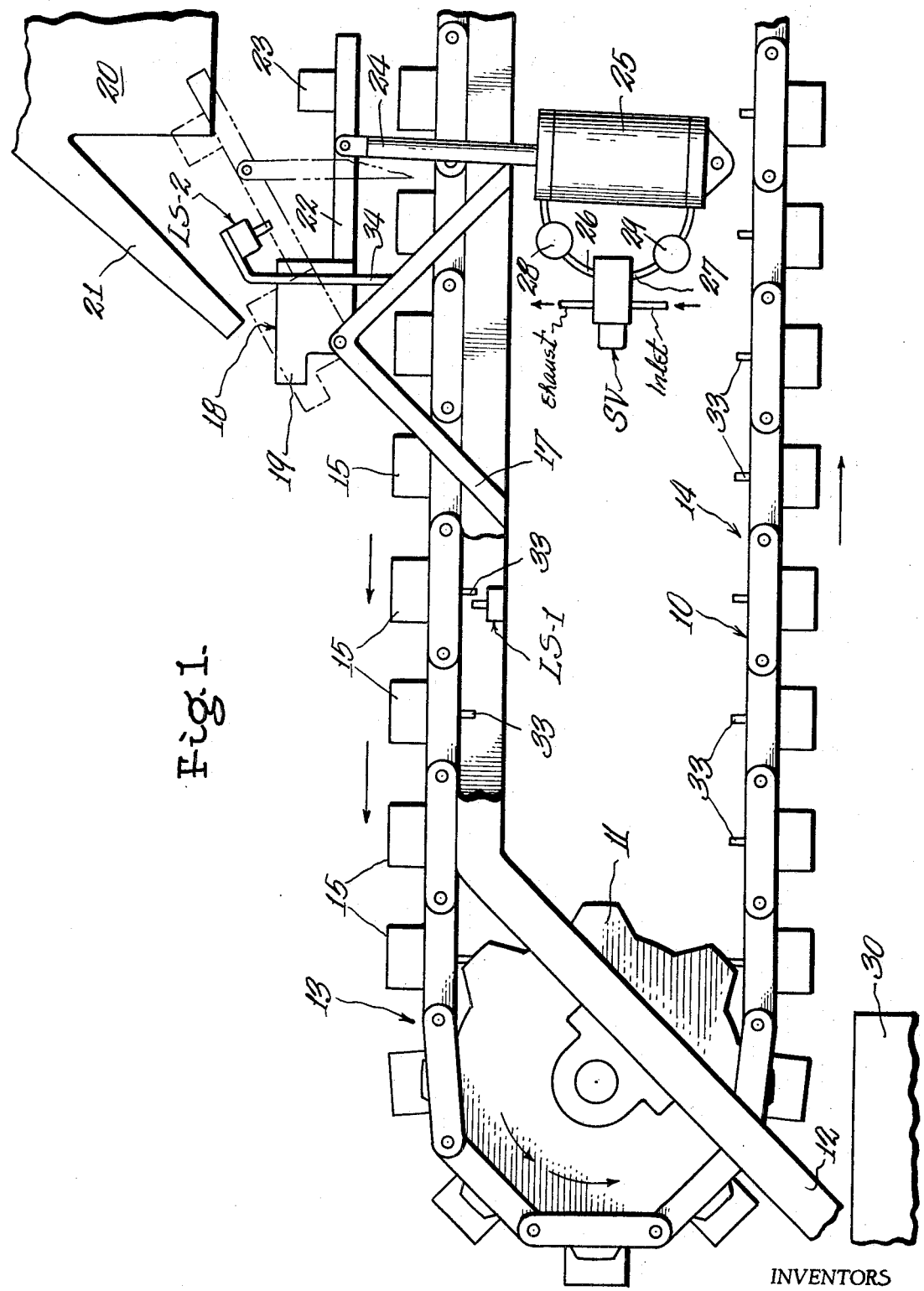

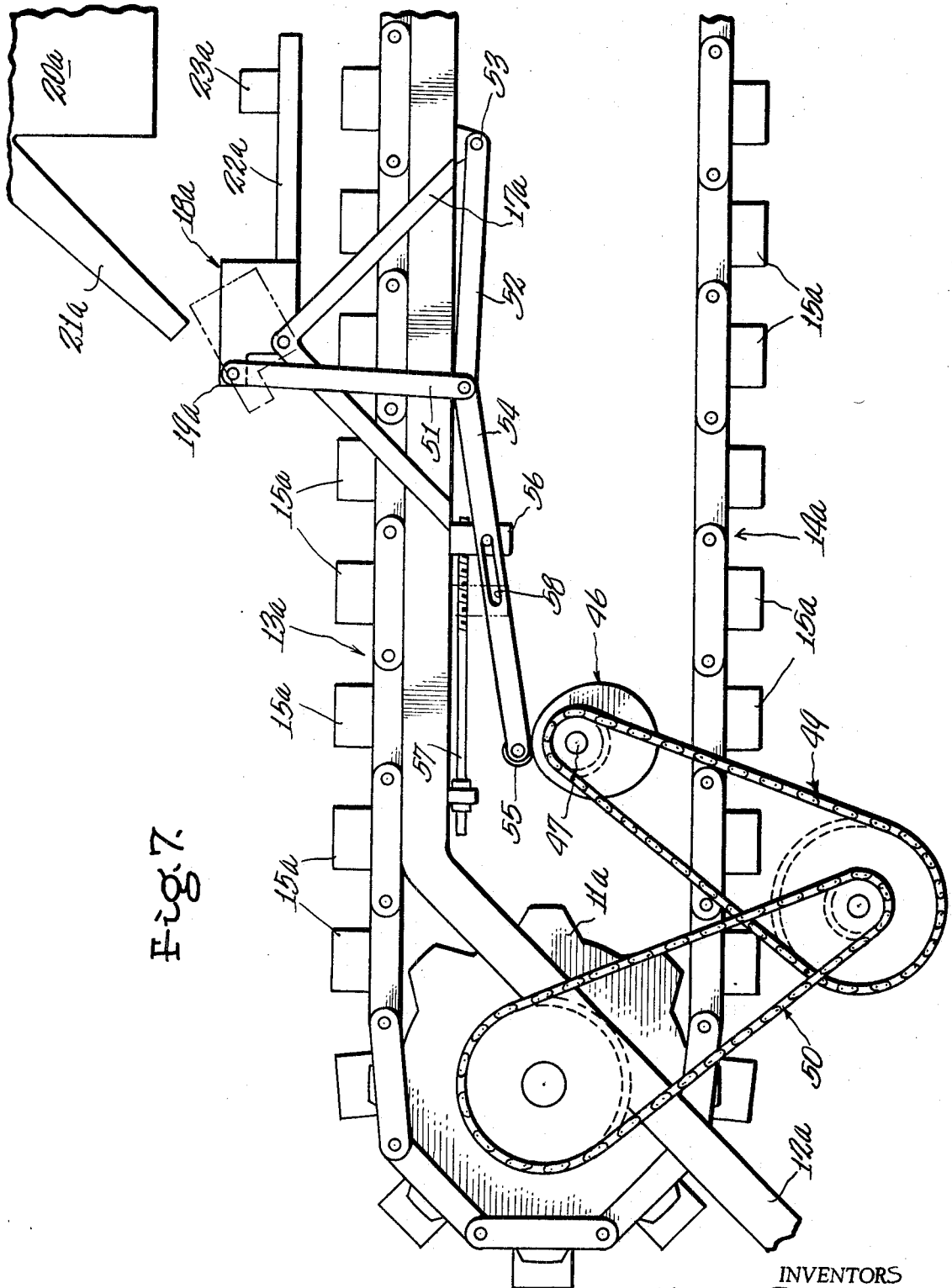

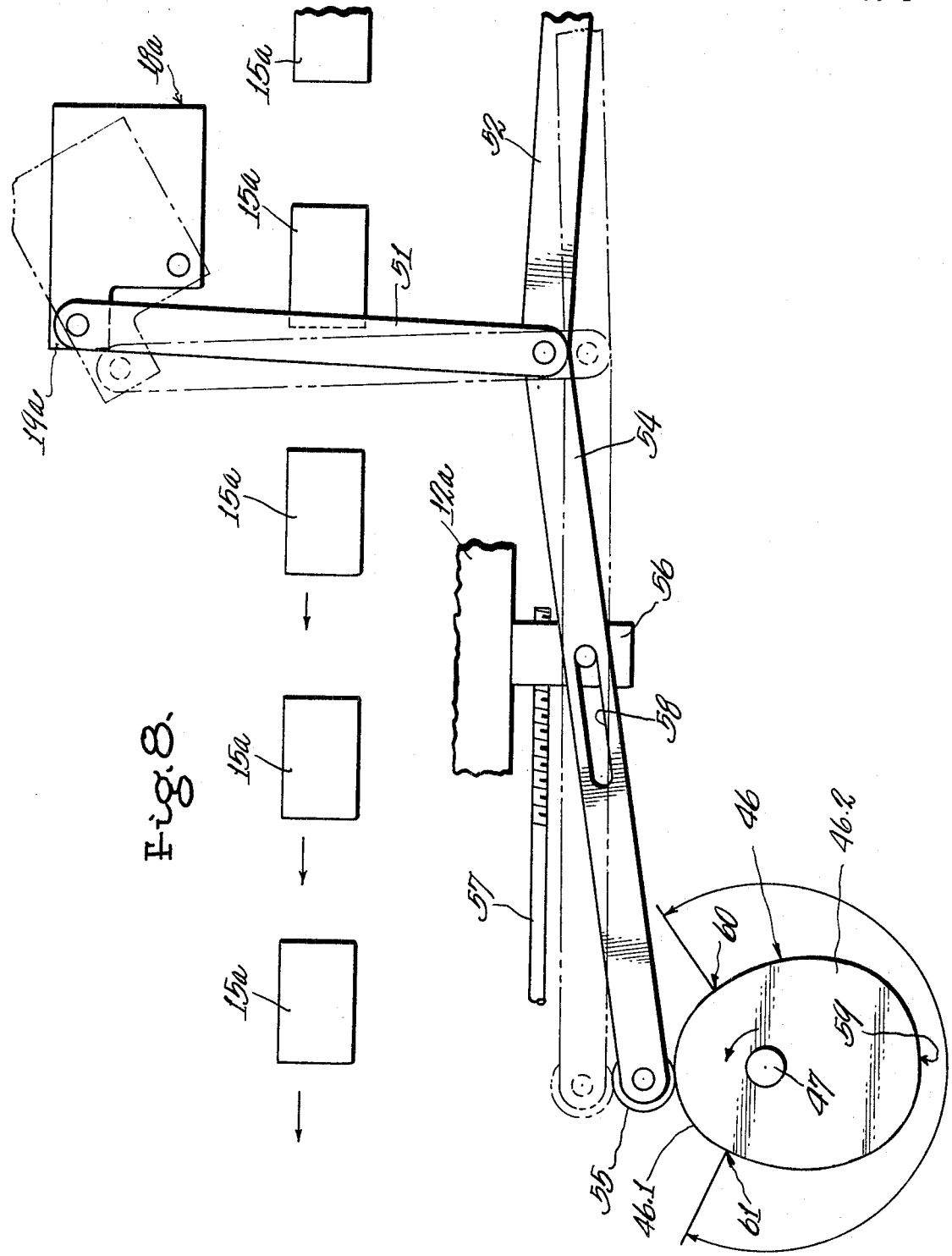

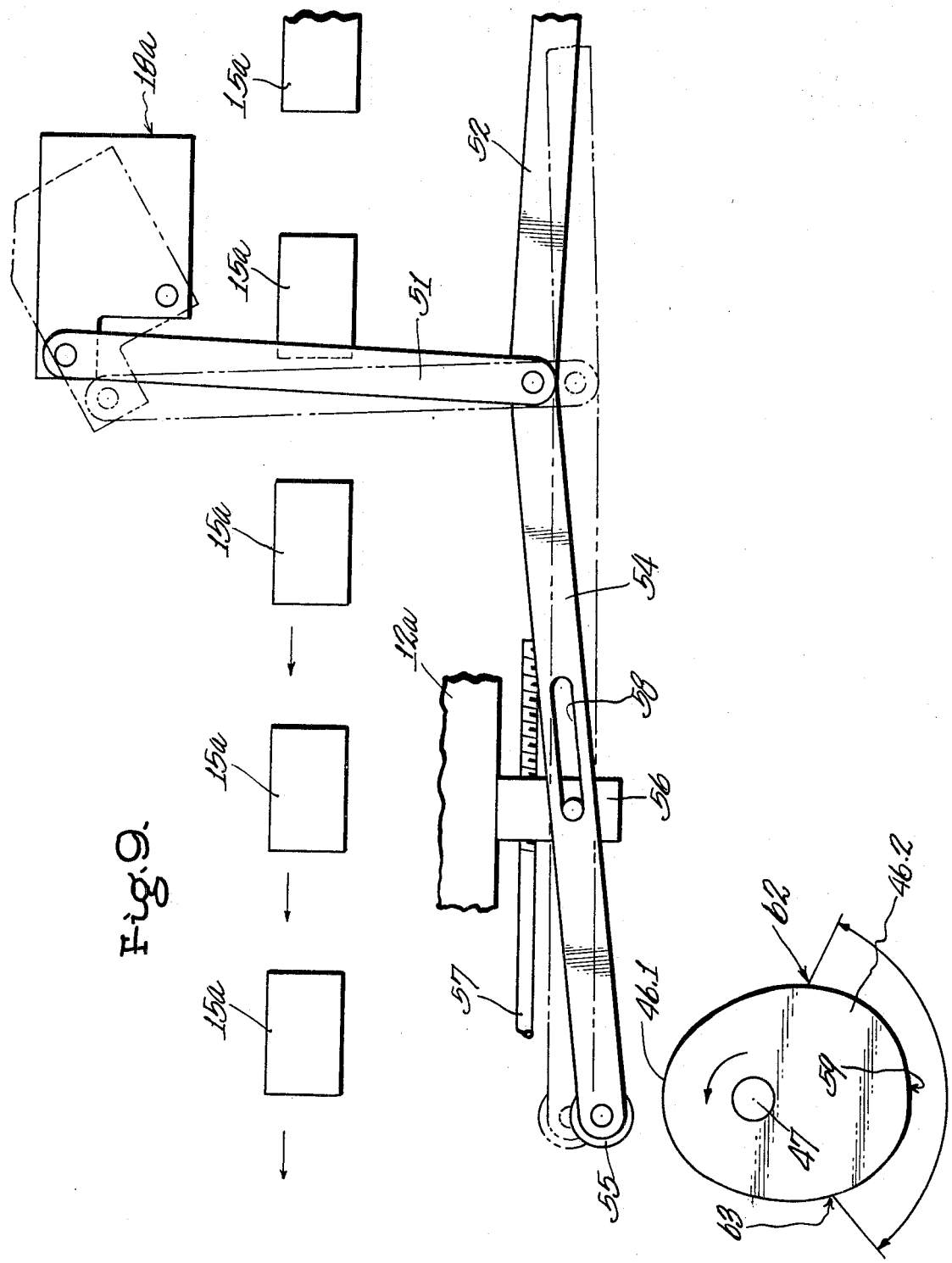

United States Patent Office 3,512,575
Patented May 19, 1970

3,512,575
APPARATUS FOR MAKING METAL BODIES
Michael Bowden, Shaker Heights, James F. McMahon, Jr., Gates Mills, and Gerald H. Kreske, Warren, Ohio, assignors to The Bradley Metal Company, Cleveland, Ohio
Filed Dec. 27, 1965, Ser. No. 516,311
Int. Cl. B22c 19/04
U.S. Cl. 164—157        2 Claims

ABSTRACT OF THE DISCLOSURE

Apparatus for continuous molding of uniform metal bodies of truncated pyramidal shape by pouring molten metal into the recess of a plurality of molds which successively pass in a predetermined path beneath a tiltable pouring ladle, and precisely controlling the pouring operation; to insure that a mold recess is beneath the ladle; to regulate the size of the bodies; and to prevent undesirable flashing from forming on the bodies.

---

The present invention relates to the continuous manufacture of metal bodies, more particularly to methods of and apparatus for such manufacture, and the principal object of the present invention is to provide new and improved methods and apparatus of the character described.

In the manufacture of steel, metallic aluminum is frequently added to the heat to remove impurities. A very convenient way to add such aluminum is in the form of relatively small bodies which may weigh approximately from two to sixteen ounces. In this manner, maximum dispersion of the aluminum in the shortest time is accomplished. Moreover, such bodies are easily handled and the precise quantity to be added is easily controlled.

In the past, apparatus has been employed to automatically manufacture these bodies; however, such apparatus has not been consistent in the size of bodies made nor has it been possible to readily change from one body size to another. Furthermore, such apparatus would, unless very carefully controlled, produce malformed bodies which the trade considered unacceptable.

In contrast, the present invention provides for the manufacture of metallic bodies in the exact size desired and makes provision for simple adjustment of the body size made. Moreover, by use of the method and apparatus herein disclosed, body malformation is eliminated. These and other advantages will readily become apparent from a study of the following description and from the appended drawings.

In the drawings accompanying this specification and forming a part of this application there is shown, for purpose of illustration, an embodiment which the invention may assume, and in these drawings:

FIG. 1 is a fragmentary side elevational view of apparatus illustrating a preferred embodiment of the present invention, FIG. 2 is an enlarged, perspective view of a detail seen in FIG. 1, FIG. 3 is a further enlarged sectional view generally corresponding to the line 3—3 of FIG. 2, FIG. 4 is an enlarged perspective view of a body made in accordance with the present invention, FIG. 5 is an enlarged perspective view of an undesirable, malformed body, FIG. 6 is a diagrammatic control circuit for effecting proper operation of the apparatus seen in FIG. 1, FIG. 7 is a view similar to FIG. 1 but of another embodiment of the present invention, FIG. 8 is an enlarged, fragmentary view of certain of the apparatus portions seen in FIG. 7, and FIG. 9 is a view similar to FIG. 8 but showing certain parts in different positions of adjustment.

Turning now to FIG. 1 wherein a preferred form of apparatus incorporating the teachings of the present invention is shown, there is fragmentarily disclosed a conveyor mechanism formed of a continuous chain 10 which passes around a rotatably mounted sprocket 11. A suitable frame structure 12 mounts the sprocket, the chain being arranged to provide an upper reach 13 and a lower reach 14. Although not shown, a sprocket similar to sprocket 11 will be provided at the opposite end of frame 12 and about which the chain 10 travels. For a purpose to appear and although only one chain 10 is herein shown, two chains in side-by-side relation will preferably be provided each, of course, being trained over its own sprockets.

Extending between the chains 10 and suitably secured to respective links thereof are a plurality of molds 15. As herein shown, a mold is provided for each chain link. As seen in FIG. 2, each mold 15 has a plurality of pockets, or recesses, 16 formed therein, the specific configuration of such recesses later being disclosed. At the present time, four recesses 16 are provided in side-by-side relation in each mold; however, it will be understood that a greater or lesser number of recesses may be provided in each mold as circumstances require. The arrangement of the molds is such that the recesses in each mold 15 face upwardly on the upper chain reaches 13 and downwardly in the lower chain reaches 14.

Pivotally mounted on the frame 12, as by a bracket structure 17, is a ladle 18. Ladle 18 has a plurality of pouring spouts 19, one for each of the mold recesses 16, and each in alignment with a respective recess. Mounted above the ladle 18 is a furnace 20 which may contain molten aluminum. A spout 21 provides for delivery (preferably continuously) of molten aluminum to the ladle 18.

When the ladle 18 is in its full-line position, there will be no delivery of molten aluminum to the underlying molds; however, when the ladle is tilted to its phantom-line position, molten metal will be poured into the underlying mold recesses 16 wherein it will solidify to form respective bodies B seen in FIG. 4.

In the embodiment of the invention seen in FIG. 1, the following structure is employed to effect tilting of the ladle 18 as above-described. Ladle 18 has an arm 22 extending therefrom on which is mounted a counterbalance weight 23. Pivotally connected to arm 22 is the piston rod 24 of an air cylinder 25. A solenoid valve SV has an inlet connected to a source of air pressure, an exhaust, an outlet 26, having conduit connection to the upper or rod end of cylinder 25 and an outlet 27 having conduit connection to the lower or blank end of such cylinder. In the normal position of parts; that is, with solenoid valve SV de-energized, air pressure will be fed to the rod end of cylinder 25 while the blank end of the cylinder will be vented to exhaust. Thus piston rod 24 will be retracted to thus retain the ladle in its full-line position. Upon energization of solenoid valve SV, the rod end of cylinder 25 will be vented to the atmosphere while air under pressure will be admitted to the blank end thereof. This will extend the piston rod 24 to its phantom-line position thus tilting the ladle.

In the event it is found that control of the rate of movement of piston rod 24 is required, combination check and variable speed control valves 28, 29 may be interposed between the valve SV and cylinder 25. Preferably, valves 28 and 29 will each provide for unrestricted flow of air to the cylinder but each will adjustably restrict flow of air therefrom.

Briefly, operation of the apparatus thus far disclosed will be as follows: Assuming the chains 10 to be traveling in the directions indicated, being driven by any suitable, preferably adjustable-speed drive device (not shown) which may be connected to the sprockets 11, the molds 15 on the upper chain reaches 13 will move from right to left (in the position of parts shown) while such molds will move from left to right along the lower chain reaches 14. As the molds 15 along the upper chain reaches successively pass beneath the ladle 18, the latter will be tilted by the cylinder 25, at the proper time, to discharge the required quantity of molten metal into respective mold recesses 16. During movement of the filled molds beyond the ladle 18, the molten aluminum will solidify therein prior to their arrival at the sprockets 11. To facilitate solidification, a water spray (not shown) may be directed on to the molds if required.

As the molds 15 pass over the sprockets 11, they will be inverted thus allowing the now solidified aluminum to drop out of the mold recesses 16 into a receiving bin or the like 30 in the form of individual bodies B (FIG. 4). The now empty molds will pass along the lower chain reaches, around other sprockets (not shown) and return along the upper reaches to again be re-filled.

To insure gravitation of the bodies B from the mold recesses 16, it is necessary that such recesses be rather sharply tapered, as seen in FIG. 3, so that the mouth of each recess is much larger than its closed end. This recess configuration, however, presents a problem in that opposed walls 16.1, 16.2 of each recess are upwardly and outwardly inclined.

Assuming, for example, that molten aluminum will be poured into the recess seen in FIG. 3 to the level X, it is to be understood that the molten metal being discharged from the ladle 18 into the mold recesses as the molds pass beneath the ladle cannot be allowed to wet either of the recess walls 16.1, 16.2, above the level X, if a malformed body, such as seen in FIG. 5, is to be avoided. In the event pouring begins too soon, wall 16.1 will be wetted by the molten metal above the level X and such molten metal will immediately solidify thereon to form an undesirable fin B.1 on the body B. If pouring continues too long, the fin would, of course, be formed along the recess wall 16.2. Thus, it will be seen that in forming bodies to the level X, pouring of the molten metal from the ladle into the molds traveling therebeneath must be confined to the span 31, to avoid body malformation. Similarly, if metal is to be poured to the level Y to make a larger body, pouring of the molten metal must be confined to the span 32.

In order to control tilting of the ladle 18 and thus the discharge of molten metal into the mold recesses in accordance with the foregoing requirements, the following construction is employed. Each mold 15 has a tripper bar 33 (FIG. 1) positioned to engage the actuator of a limit switch LS-1 disposed in their path. The function of LS-1, as will appear, is to signal the approach of a mold 15 beneath the ladle 18. Another limit switch LS-2 is mounted on a support 34 carried by the bracket 17 and is positioned so that its actuator will be engaged by the arm 22 when the ladle is in its phantom-line, or metal-pouring position.

Turning now to the control circuit shown in FIG. 6, limit switch LS-1 has a contact 34 connected to power line L-1 and contacts 35, 36 connected to power line L-2 by respective circuits 37 and 38. Interposed in circuit 37 is the solenoid actuator of solenoid valve SV while interposed in circuit 38 is the electrical actuator of an adjustable time delay relay TD-1 having normally open contacts 1-T-1 interposed in circuit 37.

Intersecting circuit 38 is a circuit 39 in which is interposed the electrical actuator of a relay R-1. The right end of circuit 39 terminates in a selector switch 40, later to be described in greater detail, and the left end thereof terminates at line L-1. Relay R-1 has a set of normally open contacts 1-R-1 interposed in the circuit 39 and another set of normally open contacts 2-R-1 in the circuit 37.

Extending from line L-1 to circuit 37 and connecting the latter to circuit 39 is a circuit 41 in which is interposed the electrical actuator of a relay R-2. Such relay has a set of normally open contacts 1-R-2 interposed in the circuit 41.

Extending across lines L-1, L-2 is a circuit 42 in which is interposed the previously mentioned limit switch LS-2 having normally open contacts. Circuit 42 has parallel branches in which are respectively interposed the electrical actuators of adjustable, time delay relays TD-2 and TD-3.

Returning to the previously mentioned selector switch 40 in circuit 39, such switch is connected to line L-2 via circuit 43 and 44. Interposed in circuit 43 are the normally closed contacts 1-TD-2 of the time delay relay TD-2 and interposed in circuit 44 are the normally closed contacts 1-TD-3 of the time delay relay TD-3. The function of switch 40 is to select the use of either circuit 43 or 44, as will later appear, and thus the use of either one of the time delay relays TD-2, TD-3. One of the relays aforesaid is adjustable through a relatively short time while the other is adjustable through a relatively long time cycle, the use of two relays being provided to achieve greater accuracy during short time cycles since it is a phenomenon that the accuracy of a long cycle, time delay relay is impaired at short, time cycle settings.

Assuming that the chains 10 are being driven (FIG. 1) to cause the molds 15 to travel in the direction of the arrows (from right to left along the upper chain reaches 13), ladle 18 will be in its full-line position since air pressure exists at the rod end of cylinder 25 and its blank end is vented to the atmosphere thus fully retracting the piston rod 24. At this time, a tripper bar 33 is approaching the actuator of LS-1; however, since the bar has not yet actuated LS-1, all of the circuits seen in FIG. 6 are de-activated as shown.

Upon engagement of a tripper bar 33 with the actuator of LS-1, the latter's contacts 34, 36 will be bridged thus energizing TD-1 in circuit 38 and R-1 in circuit 39. The energization of R-1 will close contacts 1-R-1 in circuit 39 to keep R-1 energized and will close contacts 2-R-1 in circuit 37. This latter circuit, however, remains de-energized because LS-1 has not bridged contacts 34, 35 nor are the contacts 1-TD-1 closed since TD-1 has not yet timed out. After momentarily engaging the actuator of LS-1, the tripper bar 33 will pass therebeyond thus allowing LS-1 to bridge the contacts 34, 35 once again. Current will, however, still not flow in circuit 37 until the timing out of relay TD-1 closes the contacts 1-TD-1. Despite the opening of contacts 34, 36, current will continue to flow through TD-1 and R-1 via the now closed contacts 1-R-1.

After a previously set time interval, so adjusted to insure that a mold 15 is properly positioned beneath the ladle 18, the contacts 1-TD-1 will close thus energizing the solenoid of valve SV and admitting air pressure to the blank end of cylinder 25 and venting its rod end to the atmosphere. This will extend the piston rod 24 and tilt the ladle to its phantom-line position to discharge molten metal into the underlying mold recesses 16. It will be understood that by properly adjusting the time interval between the energization of TD-1 and the closing of its contacts 1-TD-1, initial discharge of molten metal from the ladle can be so regulated as to limit contact of the molten metal to as little as part of the mold recess walls 16.1 (FIG. 3) as is necessary to prevent the previously described body malformation.

Upon disposition of the ladle 18 in its phantom-line position, arm 22 will engage the actuator of LS-2 and thus close its contacts in circuit 42. Completion of circuit 42 will energize both TD-2 and TD-3 and, after a predetermined time interval, contacts 1-TD-2 and 1-TD-3 will be opened in respective circuits 43, 44. Since selector switch 40 is positioned to use the circuit 43, the opening of contacts 1-TD-3 will have no effect; however, the opening of contacts 1-TD-2 will de-energize solenoid valve SV. De-energization of the latter will again admit air pressure to the rod end of cylinder 25 and vent its blank end to the atmosphere. This will retract piston rod 24 to thereby return the ladle to its full-line position. Upon movement of the ladle from its phantom-line position, the contacts of LS-2 will again open to de-energize TD-2 and TD-3 and re-close their contacts 1-TD-2 and 1-TD-3. All circuits will thus again be de-energized to await engagement of the next tripper bar 33 with the actuator of switch LS-1.

It will be understood that by properly adjusting the time interval between energization of relays TD-2 or TD-3 (depending upon which has been selected for use) and opening of their normally closed contacts 1-TD-2 and 1-TD-3, the length of time that the ladle will be tilted can be varied to thus control the quantity of molten metal discharged into each mold recess to thereby vary the size of the bodies formed. By holding the ladle tilted for a greater length of time, a greater quantity of metal will be poured into respective mold recesses. Conversely, by reducing the time the ladle is tilted, a smaller quantity of metal will, of course, be poured into the mold recesses.

The embodiment of the invention seen in FIG. 7 differs from that heretofore disclosed in that tilting of the ladle is effectuated through mechanical means rather than through electrical and pneumatic means. In other respects the constructions are similar and thus corresponding parts in FIG. 7 are identified by the same reference characters as before but with the suffix $a$ added.

In the embodiment of FIG. 7, a cam 46 is rotatably mounted on a shaft 47 driven by the sprockets 11a via a counter-shaft 48 and chain and sprocket sets 49 and 50. The arrangement is such that cam 46 rotates one complete revolution as each mold travels a linear distance equal to the spacing between adjoining molds.

Pivotally attached to the ladle 18a is a depending link 51 whose lower end is pivoted to the left end of a link 52 whose right end is pivotally anchored to the frame 12a at 53. Also, pivoted to the juncture of links 51, 52 is an actuating lever 54 whose free end mounts a cam follower roller 55 positioned for engagement with the cam 46. An intermediate portion of lever 54 is pivoted to a slide block 56, carried by the frame 12a, which is shiftable from the position seen in full-lines to the position seen in phantom-lines. A threaded screw 57 provides for adjustment of the position of block 56, lever 54 being slotted at 58 to accommodate movement aforesaid of block 56.

Referring also to FIG. 8 wherein the structure of FIG. 7 is fragmentarily shown to an enlarged scale, it will be noted that cam 46 has a heel or base portion 46.1 and a lobe portion 46.2. In the position of parts shown, the mold 15a immediately to the left of the ladle 18a has been filled and the mold immediately to the right of the ladle is moving into position beneath the ladle for filling. At this time, it is to be noted that the cam follower 55 is on the base 46.1 of the cam thus maintaining the lever 54, the links 51, 52 and the ladle 18a in their full-line positions.

As the mold 15a immediately to the right of the ladle moves to the left cam 46 will rotate in the direction of the arrow to engage the cam follower 55 with the cam lobe 46.2. As the cam lobe engages the follower, the latter will be raised thus rotating the lever 54 toward its phantom-line position and tilting the ladle 18a to discharge molten metal therefrom. The arrangement is such that when the mold recesses are centered beneath the spout 19a of the ladle, the center of the cam lobe (point 59) will be engaged with the cam follower and the latter will be at its phantom-line position to thus fully tilt the ladle.

In the position of parts seen in FIGS. 7 and 8; i.e., with the slide block 56 all the way to the right; the initial position of the cam follower 55 was on the base 46.1 of the cam as previously described. Thus, tilting of the ladle commenced as soon as point 60 of the cam reached the follower, tilting gradually and increased to a maximum as the cam rotated to engage point 59 with the follower, and will gradually decrease to zero once again as point 61 of the cam arrives at the follower. With this position of the block 56, the duration of lift of the cam follower and duration of tilt of the ladle is at a maximum from cam point 60 to cam point 61. The maximum quantity of metal will thus be poured into each mold recess as the molds pass under the ladle and thus bodies of maximum size will be produced. Obviously, the profile of cam 46 will be such that pouring of metal from the ladle will be limited as previously described, to prevent formation of malformed bodies.

When minimum size bodies are to be formed, the slide block 56 will be shifted all the way to the left, as seen in phantom lines in FIG. 7 and in full lines in FIG. 9. Note that in this position of the slide block, the normal position of the cam follower is spaced well away from the cam base portion 46.1 as clearly shown in FIG. 9. Accordingly, as a mold approaches the ladle 18a and the cam rotates in the direction of the arrow, the cam follower 55 will not be engaged by the cam lobe 46.2 until point 62 of the cam reaches the follower. Maximum lift of the cam follower to its same phantom line position as before and thus maximum tilt of the ladle will occur when campoint 59 reaches the follower and the cam follower will be returned to its full-line position when cam point 63 arrives at the follower. At this position of adjustment of the slide block 56, the duration of lift of the cam follower and duration of tilt of the ladle will be at a minimum or from cam point 62 to cam point 63. Obviously, if intermediately sized bodies are to be poured, the slide block 56 will be positioned intermediate the extreme positions seen in FIGS. 8 and 9.

In view of the foregoing it will be apparent to those skilled in the art that we have accomplished at least the principal object of our invention and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that our invention is not limited thereto.

We claim:

1. In apparatus for the continuous casting of solid metal bodies and including a container of molten metal having a discharge spout, a plurality of molds each having an upwardly directed, metal-receiving recess which is larger at the top than it is at the bottom, said recess being defined by opposed, oppositely inclined wall portions, means for continuously and successively moving said molds in a predetermined travel path beneath said spout with one wall portion aforesaid of each recess leading with respect to mold movement in said path and the other wall portion aforesaid of each recess trailing with respect to mold movement in said travel path, the improvement comprising:

flow control means for effecting gravitation of molten metal from said spout in a generally vertical path into successive mold recesses to fill them to a predetermined level as said molds move therebeneath while preventing impingement of the gravitating metal on mold recess portions above said predetermined level, said flow control means initiating gravitation of metal from said spout only after arrival at said vertical path of as much of the upper part of each recess leading wall portion which will be above said predetermined level and such flow control means terminating gravitation of metal from said spout at least upon arrival at said vertical path of as much of the upper part of each recess trailing wall portion which will be above said predetermined level, said flow control means including a first time delay device and means for activating the same prior to the time each recess leading wall portion arrives at said vertical path, said time delay device initiating gravitation of molten metal from said spout a predetermined time delay after its activation aforesaid, a second time delay device activated after expiration of the time delay of said first time delay device, said second time delay device terminating gravitation of molten metal from said spout a predetermined time delay after its activation aforesaid, and means for adjusting the time delay periods of each of said time delay devices to prevent impingement of gravitating molten metal on both the leading and trailing recess wall portions aforesaid which will be above said predetermined level, each time delay device aforesaid comprising a time delay relay, and said means for activating said first time delay device comprising switch means responsive to the position of successive molds relative to said spout.

2. The construction of claim 1 wherein motor means operates to effect initiation and termination of gravitation of molten metal from said spout, wherein said first time delay relay effects operation of said motor means to initiate gravitation of molten metal from said spout, and wherein said second time delay relay effects operation of said motor means to terminate gravitation of metal from said spout.

References Cited

UNITED STATES PATENTS

| | | | |
|---|---|---|---|
| 2,151,683 | 3/1939 | Busche | 164—130 |
| 3,122,800 | 3/1964 | Naffziger | 164—155 |
| 3,343,591 | 9/1967 | Lorang | 164—324 X |
| 3,319,728 | 5/1967 | Johansson et al. | 164—155 X |
| 2,775,802 | 1/1957 | Boughton | 164—331 |
| 3,259,485 | 7/1966 | Kootz et al. | 266—36 X |
| 2,743,491 | 5/1956 | Berry | 164—154 X |
| 2,676,368 | 4/1954 | Heiden et al. | 164—154 X |
| 2,227,872 | 1/1941 | Willard | 164—154 X |
| 2,806,264 | 9/1957 | Keating. | |
| 2,891,292 | 6/1959 | Sukava | 164—156 |
| 2,763,904 | 9/1956 | Sukava | 164—156 |
| 3,188,704 | 6/1965 | Sukava | 164—156 |
| 2,943,369 | 7/1960 | Szwed | 164—154 |

J. SPENCER OVERHOLSER, Primary Examiner

V. RISING, Assistant Examiner

U.S. Cl. X.R.

141—191; 164—130, 136, 328, 329, 336; 222—166; 266—38